United States Patent
Dowgiallo, Jr.

(10) Patent No.: US 7,428,137 B2
(45) Date of Patent: Sep. 23, 2008

(54) HIGH PERFORMANCE CAPACITOR WITH HIGH DIELECTRIC CONSTANT MATERIAL

(76) Inventor: Edward J. Dowgiallo, Jr., 17625 River Shore Dr., Tall Timbers, MD (US) 20690

( * ) Notice: Subject to any disclaimer, the term of this patent is extended or adjusted under 35 U.S.C. 154(b) by 332 days.

(21) Appl. No.: 11/291,987

(22) Filed: Dec. 2, 2005

(65) Prior Publication Data
US 2006/0120020 A1 Jun. 8, 2006

Related U.S. Application Data

(60) Provisional application No. 60/633,117, filed on Dec. 3, 2004.

(51) Int. Cl.
H01G 4/06 (2006.01)
(52) U.S. Cl. ............... 361/321.2; 361/321.1; 361/306.1; 361/311; 361/313; 361/301.5
(58) Field of Classification Search ............. 361/321.2, 361/321.1, 311–313, 306.1, 301.4, 301.5, 361/306.3
See application file for complete search history.

(56) References Cited

U.S. PATENT DOCUMENTS 4,189,760 A 2/1980 Marshall
4,870,538 A 9/1989 Baldwin et al.

(Continued)

FOREIGN PATENT DOCUMENTS

JP 2003-218227 7/2003
JP 2004-292271 10/2004

OTHER PUBLICATIONS

"Nanocapacitor Technology for Specialty Market Opportunity." MBAGlobalNet.com, 1 page printed from the Internet Jun. 9, 2005.

(Continued)

*Primary Examiner*—Nguyen T Ha
(74) *Attorney, Agent, or Firm*—R & R Law; Paul L. Ratcliffe, Esq.

(57) ABSTRACT

A multilayered high performance capacitor formed of two or more conductors with a dielectric layer and one or more a dielectric-conductor interface layer sandwiched in between the conductors. The capacitor may be fabricated using many thin layers, at the nano level, providing a nanocapacitor. The capacitor may employ an interleaved structured where numerous conductor layers are interleaved with other conductor layers. The dielectric layers may be multilayered or a single layer and may consist of materials with high dielectric constants ranging from 800 to over 1 million, including materials in the perovskite-oxide family. The capacitor can be shaped, sized and the appropriate materials selected to obtain breakdown voltages within the range of 0.1 to over 11 MV/cm and to obtain specific energies and energy densities equivalent to or exceeding the power characteristics of known capacitors, fuel cells, and batteries. The nanocapacitor may be combined with other nanocapacitors to form stacks, packs, or grids of cells where the cells may be connected in series, parallel or both to provide increased energy or power characteristics.

25 Claims, 5 Drawing Sheets

U.S. PATENT DOCUMENTS

| | | |
|---|---|---|
| 5,144,527 A | 9/1992 | Amano et al. |
| 5,414,588 A | 5/1995 | Barbee, Jr. et al. |
| 5,434,742 A * | 7/1995 | Saito et al. ............... 361/321.5 |
| 5,471,363 A | 11/1995 | Mihara |
| 5,486,277 A | 1/1996 | Barbee, Jr. et al. |
| 5,742,471 A | 4/1998 | Barbee, Jr. et al. |
| 5,870,273 A | 2/1999 | Sogabe et al. |
| 5,922,214 A | 7/1999 | Liu et al. |
| RE37,032 E | 1/2001 | Gardner et al. |
| 6,370,010 B1 * | 4/2002 | Kuroda et al. ............ 361/306.1 |
| 6,380,627 B1 | 4/2002 | Weihs et al. |
| 6,487,065 B1 | 11/2002 | Nishino et al. |
| 6,577,494 B2 | 6/2003 | Watanabe et al. |
| 6,602,722 B2 | 8/2003 | Yamamoto et al. |
| 6,606,237 B1 * | 8/2003 | Naito et al. .............. 361/306.3 |
| 6,813,931 B2 | 11/2004 | Yadav et al. |
| 6,829,137 B2 | 12/2004 | Konaka et al. |
| 6,885,056 B1 * | 4/2005 | Dornisch et al. ............ 257/310 |
| 6,888,188 B2 | 5/2005 | Basceri |
| 6,891,714 B2 | 5/2005 | Sakashita |
| 6,900,977 B2 | 5/2005 | Nakamura et al. |
| 7,091,548 B2 * | 8/2006 | Jeong et al. ................. 257/310 |
| 7,224,573 B2 * | 5/2007 | Sommariva et al. ......... 361/311 |
| 2004/0071944 A1 | 4/2004 | Weir et al. |
| 2005/0107241 A1 | 5/2005 | Umeda et al. |

OTHER PUBLICATIONS

"Pervoskite Thin Films for High Frequency Capacitor Applications," Annual Reviews, 1 page printed from the Internet Jun. 9, 2005.

Li et al., "High Permitivity neodymium-doped barium titanate sintered in pure nitrogen," Dec. 22, 2003.

Lin et al., "Preparation of core/shell structured NiO-based ceramics and their dielectric properties," Mar. 16, 2005.

Bender et al., "The effect of starting powders on the giant dielectric properties of the pervoskite $CaCu_3Ti_4O_{12}$," 2005.

Bruno et al., "High-performance multilayer capacitor dielectrics from chemically prepared powders." Nov. 19, 1992.

Sinclair et al., "$CaCu_3Ti_4O_{12}$: One-step internal barrier layer capacitor," Jan. 24, 2002.

West et al., "Novel high capacitance materials" $BaTiO_3$:La and $CaCu_3Ti_4O_{12}$, 2003.

Tselev at al., "Evidence for power-law frequency dependence of intrinsic dielectric response in the $CaCu_3Ti_4O_{12}$," Aug. 5, 2004.

Homes et al., "Optical response of high-dielectric constant perovskite-related oxide," Jul. 27, 2001.

Fang et al., "Effects of post-anneal conditions on the dielectric properties of $CaCu_3Ti_4O_{12}$ thin films prepared on $Pt/Ti/SiO2/Si$ substrates," 2002.

Ramirez et al., "Giant dielectric constant response in a copper titanate," abstract only, Apr. 24, 2000.

* cited by examiner

HIGH PERFORMANCE CAPACITOR WITH HIGH DIELECTRIC CONSTANT MATERIAL

This application claims the benefit of U.S. Provisional Patent Application 60/633,117 filed on Dec. 3, 2004, the entirety of which is incorporated herein by reference.

FIELD OF THE INVENTION

The present invention relates generally to the field of capacitors. Particularly, the present invention relates to high performance and high energy-density capacitors, their related structure and method of fabrication.

BACKGROUND OF THE INVENTION

Capacitors are one of the earliest electrical components and essentially consist of two parallel plates which possess a certain capacity to store an electric charge separated by a dielectric material. The effectiveness of a given capacitor is determined by the structure of the capacitor, the plates, the dielectric material, and the method of fabrication.

Capacitors provide a reliable source of power in many applications. Although they are widely used on integrated circuits (ICs) they are also used as a power supply source for non-IC applications. Capacitors can be manufactured in various shapes and sizes and provide comparable characteristics to other common power supply devices.

Other known and common devices for providing power include batteries and fuel cells. Batteries are a reliable source of power. However, batteries rarely exceed 200 Whr/kg and their cycle life rarely exceeds 1,000 cycles. Further, there appears to be limited ability to dramatically improve the output and cycle life of batteries from a chemistry standpoint. Fuel cells provide power through an electro-chemical process which often provides a cleaner and more environmentally safe device. However, fuel cells have several limitations including high manufacturing costs, complexity, size and weight.

In comparison, capacitors provide advantageous characteristics over batteries and fuel cells in cycle life, size, weight, safety issues, and manufacturing costs. However, conventional and known capacitors have power limitations, including double layer or ultra-capacitors, with these capacitors not exceeding 15 Whr/kg.

Therefore, what is needed is a high performance and high energy-density capacitor with power characteristics achieving and exceeding the power characteristics of known power sources.

SUMMARY OF INVENTION

The present invention overcomes the obstacles and limitations described above by providing a high performance and high energy-density capacitor with power characteristics exceeding known capacitors.

The present invention also provides high performance and high energy-density capacitors utilizing a nanostructure to provide a nanocapacitor with specific energies ranging from 10 Whr/kg to more than 10,000 Whr/kg with corresponding energy densities.

Another object of the present invention is to provide an extremely high energy nanocapacitor by significantly increasing the dielectric constant of the device and the corresponding structure and configuration. The present invention makes use of high permittivity materials within the nanostructure of the capacitors to obtain power characteristics not previously realized in capacitors.

Prior to the present invention, the use of high permittivity materials has focused on their application within conventional PCB (Printed Circuit Board) sized components. The technology push prior to the present invention has been towards small real-estate devices such as surface mount components, in-circuit components, or embedded circuit board components in an effort to reduce overall circuit board size while maintaining power characteristics. The present invention provides a nanocapacitor device, structure and fabrication method which enables high permittivity dielectrics to be utilized in scalable capacitors to exceed the power characteristics of known capacitors.

The scientific community has been interested in the fundamental characterization and physical phenomenon of high permittivity materials, but with few practical implementations. In connection with the reduction of printed circuit components, integrated circuit (chip) manufacturers have been investigating materials that can offer reduced space for memory storage. The increased capacitance of micro-capacitors at the integrated circuit level has allowed IC chips to be continually reduced in size, as a smaller device with improved materials can do the job of larger devices based on poorer materials.

However, the nanocapacitor of the present invention has taken science in the opposite direction, going from micro components to macro-scaled components. The nanocapacitor of the present invention is derived of high permittivity materials that have been optimized at the nanometer level to then, utilizing either thin film or thick film layering techniques depending on the application, produce a size scaleable capacitor device with significant power characteristics.

The present invention provides a capacitor, comprising: a top conductor layer of a conductive material; a bottom conductor layer of conductive material; and an intermediate dielectric layer of a dielectric material disposed between the top layer and the bottom layer; wherein the dielectric layer is comprised of a dielectric material with a dielectric constant in the range 1000 to 1,000,000. Further, the capacitor might comprise an interface layer comprised of a mix of said conductive material and said dielectric material disposed between the dielectric layer and the conductor layers. Still further, the capacitor might additional intermediate conductor layers disposed between intermediate dielectric layers and interface layers is utilized. The conductive, dielectric, and interface layers of the capacitor may be formed as a single layer or multilayer.

The capacitor of the present invention produces considerable power and energy characteristics capable of producing specific energies in the range of 5-10,000 Whr/kg and energy densities in the range of 20-76,000 Whr/l. The capacitor of the present invention may utilize dielectrics with dielectric constants in the range from 800 to 1,000,000. The capacitor may employ terminals of the top conductor layer and bottom conductor layer may function as electrodes. The intermediate dielectric layers are connected and the intermediate conductor layers are interleaved. The capacitor layers may have a thickness in the sub-micron and micron ranges depending on the fabrication technique.

Stull further, the capacitor of the present invention may be positioned and connected to additional capacitors to form an array, bank, or grid. The array, bank, or grid could employ fuses to prevent the entire array, bank, or grid from shorting if one capacitor is shorted.

The present invention also includes a method of manufacturing a multilayer capacitor including the steps of depositing a conductive material onto a substrate to form a capacitor device; heating the device; masking selected areas of the device; depositing an interface layer on the device, removing the mask, heating the device, masking the device again, depositing a dielectric layer on the device, removing the mask; heating the device; depositing a top conductor layer on the device, and then heating the capacitor. The method could be done by print screening, pulse laser deposition and other techniques. The method could also repeat the pattern of depositing a conductive layer, an interface layer, a dielectric layer, a second interface layer and another conductive layer until the desired number of layers is obtained. The method could further include steps so that the conductive layers are formed to be connected to a conductive terminal and are formed in an interleaved formation. The dielectric layers are formed to be interconnected to one another. Still further, the method could comprise the step of positioning the fabricated capacitors adjacent to one another and interconnecting them to form an array, bank, or grid of capacitors. The method could also comprise the step of positioning and connecting fuses in between the capacitors.

DETAILED DESCRIPTION

The system of the present invention will now be described in conjunction with FIGS. 1-11. The present invention provides a capacitor which overcomes the limitations described above by providing high performance and high energy-density nanocapacitor.

Nanostructure multilayer materials are characterized by their near-atomic scales (particle size and layer thickness) and large ratios of interfacial area to volume. Through deposition processes it is now possible to produce thick macroscopic nano-structure multilayer materials to fabricate free standing high quality structures above 300 microns thick and containing up to 50,000 individual layers. The present invention provides a parallel-plate conductor-dielectric structure capacitor designed and fabricated using multilayer technology with engineered properties affected by structure or design, materials selection, the synthesis process, and materials processing. The flexibility in materials and processes provide a great advantage compared to conventional capacitor fabrication techniques that use only bulk materials. This is also an advantage over double-layer ultracapacitors.

Proper material choices can also prevent electrochemical reactions and diffusion between the conductor and dielectric. The nanocapacitor dielectric local interfacial work function can be increased to reduce charge injection and thus increase breakdown voltage.

Figure 1:
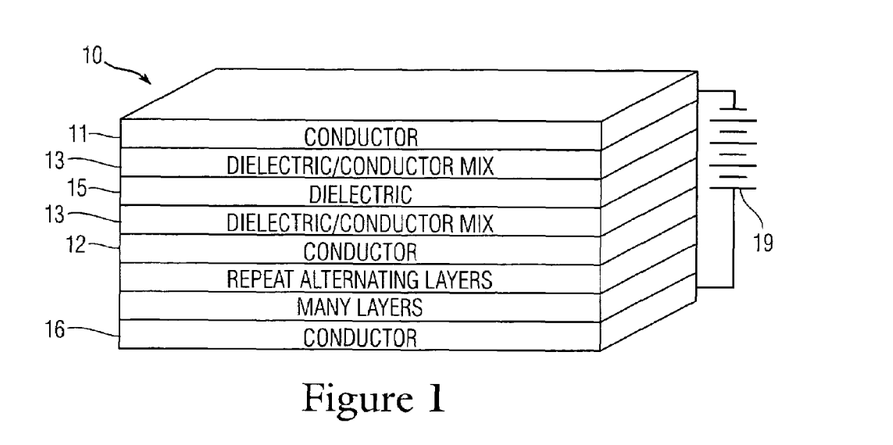
FIG. 1 is a perspective cross section view of a multilayer nano-structure embodiment of the present invention.

As seen in FIG. 1, the present invention provides a nanocapacitor 10 which utilizes a multi-layer nano-structure design. FIG. 1, provides an exploded view of the nanocapacitor 10 displaying the various layers on a nanostructure level. The nanocapacitor 10 includes at least a top conductive layer 11 and at least one bottom conductive layer 16. The conductive layers may be metal or some other conductive material. Sandwiched between the top conductive layer 11 and bottom conductive layer 16 would be repeating patterns of a dielectric-conductor interface layer 13, a dielectric layer 15, a second dielectric-conductive interface layer 13, and a conductor layer 12.

More specifically, the embodiment shown in FIG. 1 represents a multi-layer nanocapacitor which is comprised of multiple layers. The nanocapacitor 10 includes a top conductive layer 11 and bottom conductive layer 16. After the top conductive layer 11 there is a dielectric-conductor interface layer 13, a dielectric layer 15, another dielectric-conductor interface layer 13, and an intermediary conductor layer 12. Below the intermediary conductor layer 12 the cycle or pattern of layers would repeat itself with another dielectric-conductor interface layer 13, a dielectric layer 15, another interface layer 13, and a conductor layer 12 until the bottom conductor layer 16. The conductor layers 11, 12, 16 are ultimately connected to conductive terminals (not shown) which are connected to a voltage source 19. Alternatively, the top conductor layer 11 and bottom conductor layer 16 may act as electrodes and be connected to the voltage source 19.

The dielectric material may be laid down in a single layer, or multiple layers, by thin film deposition, thick film techniques, or other appropriate methods to form a laminate. The conductor layers may also be laid down in a single layer, or multiple layers, by thin film deposition, thick film techniques, or other appropriate methods to form a laminate. The individual layer thickness can range in size from sub-micron to micron levels. The thickness of any individual layer using pulse laser deposition is approximately 0.5 microns and approximately 100 microns for screen printing.

The dielectric-conductive interface layers 13 are composed of a mix of dielectric material and conductor material. The percentage of conductor material to dielectric material present in the dielectric-conductor interface layers may vary from 0-100 percent (%). The interface layers 13 that lie between the conductor layers 11, 12, 16 and primary dielectric layers 15 can be a mix of the same conductor and dielectric already being utilized or a mix or another dielectric or metal/metal oxide, and any combinations thereof. The interface layers 13 may also be metal based coatings applied to the primary conductor layers 11, 12, 16 to allow for improved adhesion of the dielectric layers 15 that follow. Still further, a less expensive metal conductor can be utilized as a larger conducting medium for carrying large currents, while the typically more expensive mating or interface layer 13 can be a proportionally thinner layer than the primary conductor layer 11, 12, 16.

The dielectric-conductor interface layers may be comprised of materials that increase the local interfacial work function, wherein charge injection is limited to provide for increased breakdown voltage. Further, the dielectric-conductor interface layers may be comprised of materials that provide for a limiting of electrochemical reactions and diffusion between the metal conductor layer(s) and the multilayer dielectric. The interface layer 13 can also include alternately deposited thin layers of two or more dielectric materials with different dielectric constants. This allows an intermixing of several materials for an optimum tradeoff between the dielectric value and the breakdown voltage.

In general, interface of the materials rather than bulk phenomena dominate the breakdown process when high electric fields are applied (e.g., the Helmholtz layer phenomenon). By depositing a very thin interface layer 13 of a particular material between a conductor layer 11, 12, 16 and a dielectric layer 15, the interfacial work function can be adjusted to reduce carrier injection and increase breakdown voltage. Atomically smooth interfaces can be maintained over macroscopic distances thereby reducing localized electric field stresses and further enhancing the overall breakdown voltage of the device as a whole. The use of multilayer dielectric materials enable edge effects to be mitigated which might otherwise dramatically reduce the working voltage of a capacitor of the present invention. Such edge effects include the intensification of electric field lines at discontinuities (e.g., triple-points).

Still further, these interface layers 13 could be used to provide a coating on the conductor layers 11, 12, 16 or dielectric layers 15. A coating such as aluminum oxide and calcium magnesium alumino-silicate-glass on calcined composition-modified barium titanate powder provides many enhancement features. These coating materials exhibit exceptional high voltage breakdown when coated onto the various materials. Specifically, they have been shown to increase the breakdown voltage of ceramics comprised of the coated particles from $3 \times 10^6$ V/cm of the uncoated basis material to around $5 \times 10^6$ V/cm of such materials.

In a preferred embodiment, fabrication of the nanocapacitor would start with the bottom conductive layer 16 with the interface layers 13, dielectric layers 15, and conductive layers 11, 12 deposited when appropriate using thin film deposition techniques, thick film processes or other appropriate deposition or fabrication techniques.

Figure 2:
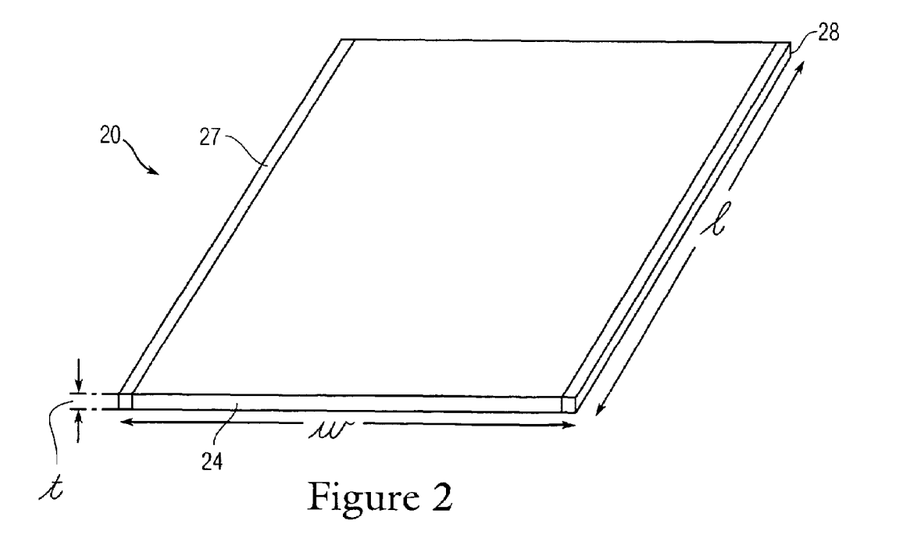
FIG. 2 is a perspective view of a flat rectangular shaped capacitor in accordance with the present invention.

FIG. 2 provides an illustration of one implementation of the present invention in a flat rectangular form. This flat form or "flatpack" capacitor 20 can vary in dimensions including the length (l), width (w), and thickness (t) to accommodate the application. As an example, the flatpack 20 could be large with approximate dimensions of 20 cm wide by 30 cm long with a thickness of 0.1 cm. A flatpack 20 with these rather large dimensions would have a large surface area which might be prone to more manufacturing defects but would provide significant power characteristics.

A flatpack capacitor 20 with dimensions of 1.5 cm wide by 1.5 cm long by 0.1 cm thick could provide considerable power characteristics in a capacitor less prone to manufacturing defects. The smaller flatpack capacitor 20 could then be connected and grouped with additional flatpack capacitors 20 to achieve significant power and energy characteristics as will be discussed in more detail below in conjunction with FIGS. 5-9

As seen in FIG. 2, the flatpack capacitor 20 has terminals 27, 28 for positive and negative connection to a voltage source. In the preferred embodiment, the terminals 27, 28 are copper (Cu), but the terminals could me made of other appropriate conductive materials such as Silver, Gold, Titanium, and Platinum or any appropriate conductive material. The nanocapacitor structure or nano-layers shown in FIG. 1 comprise the internal structure 24 of the flatpack 20 design. The capacitor could be fabricated such that the bottom layer acts as an electrode or terminal and the top conductor layer acts as the other electrode or terminal provided the appropriate conductor layers throughout the capacitor are connected.

Figure 3:
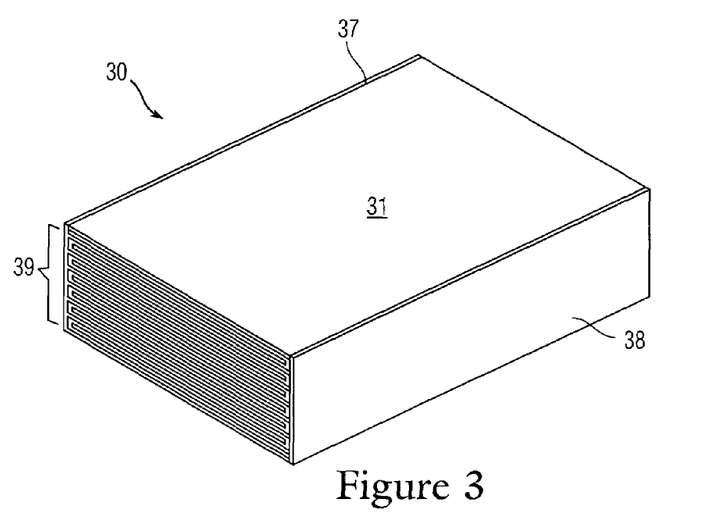
FIG. 3 is a perspective view of a nanocapacitor configuration of the present invention.
Figure 4:
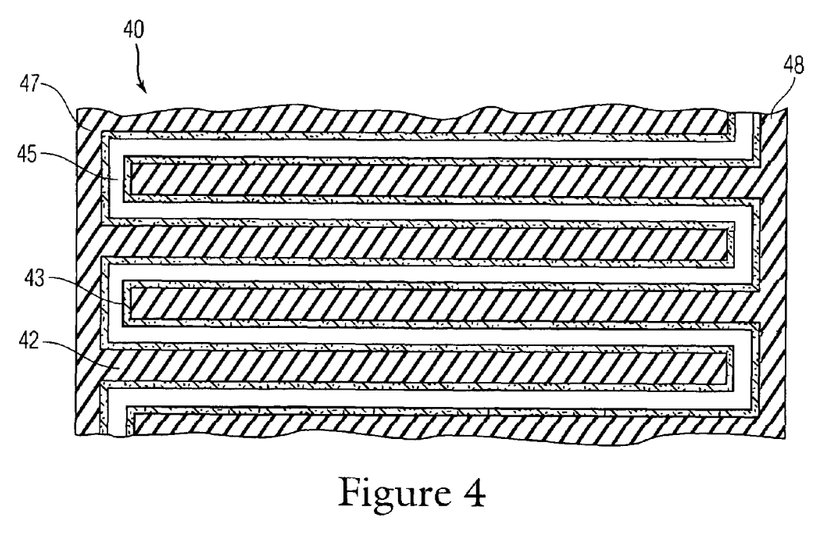
FIG. 4 is an enlarged cross section view of the layers within the nanocapacitor of the present invention.

FIG. 3 provides an exploded view of the flatpack 30 showing the terminals 37, 38, the top conductive layer 31, and the interleaving of the various nano-layers 39. FIG. 4, provides an exploded view of the nano-layers 39 (FIG. 3) showing the interleaved layers. The conductive layers 42 are connected to or in contact with the terminals 47, 48. The terminals 47, 48 may be formed during deposition through repeated deposition of conductive material at the edges of the flatpack capacitor 20 or the terminals 47, 48 may be connected to the conductive layers using known mechanical and chemical techniques like bonding, epoxy, and soldering.

Surface bonds between conductor layers and the terminals using flowable metals produced by common techniques, such as solder or conductive epoxy/inks, form low resistance connections that have essentially the mechanical strength of welds, plus optimal electrical paths for energy extraction.

Terminal 47 and its connected conductive layers 42 create comb like fingers which are interleaved between the fingers of the conductive layers 42 attached to terminal 48. Filling the space in between the interleaved fingers or layers 42 is a dielectric material 45. As discussed above in conjunction with FIG. 1, the capacitor 40 may employ a dielectric-conductor interface layer 43 between the dielectric material 45 and conductive layers 42.

Still further, the interleaved fingers or layers 42 and dielectric-conductor interface layers 43 can be shaped or designed to optimize the current distribution, simplify fabrication or enhance the connection between the terminals 47, 48 and conductive layers 42. For example, the fingers or layers 42 might be tapered, the base of the fingers 42 might be wider at the connection to the terminals 47, 48, or the dielectric-conductor mix interface layer 43 might vary in material used, thickness or percentage mix based upon location within the nanocapacitor structure 40.

In a preferred embodiment of the present invention, as described in conjunction with FIGS. 1-4, the flatpack 20 would include terminals 27, 28 made of copper (Cu), the conductive layers 11, 12, 16 would also be made of copper (Cu) and the dielectric layers 15 would utilize a perovskite-oxide such as $CaCu_3Ti_4O_{12}$ (CCTO). The dielectric-conductor interface layers would be comprised of a mix of Cu and CCTO. Terminals 27, 28 would be connected to the positive and negative leads of a voltage source 19. By varying the length, width, and number and thickness of layers the nanocapacitor device can be scaled to fit the size and power requirements for a particular application.

Figure 5:
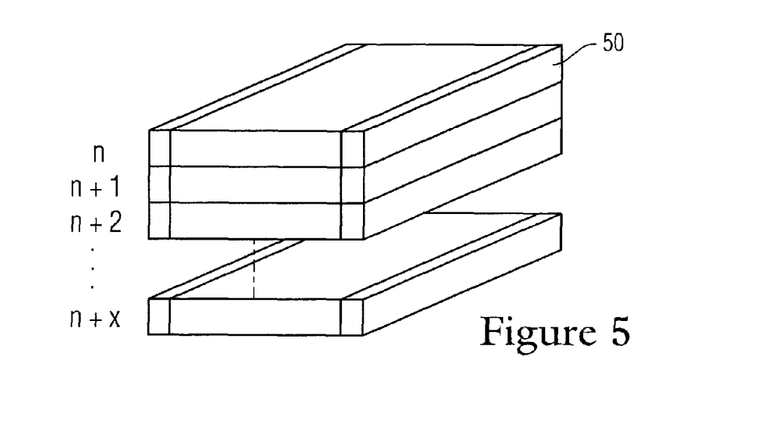
FIG. 5 is a perspective view of a stacked group of the capacitors of FIG. 2.
Figure 6:
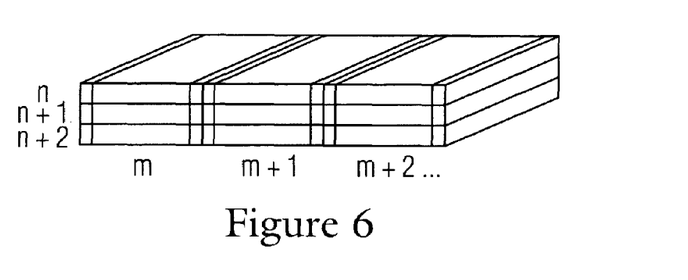
FIG. 6 is a perspective view of an array or bank of connected stacks of the capacitors of FIG. 2.
Figure 7:
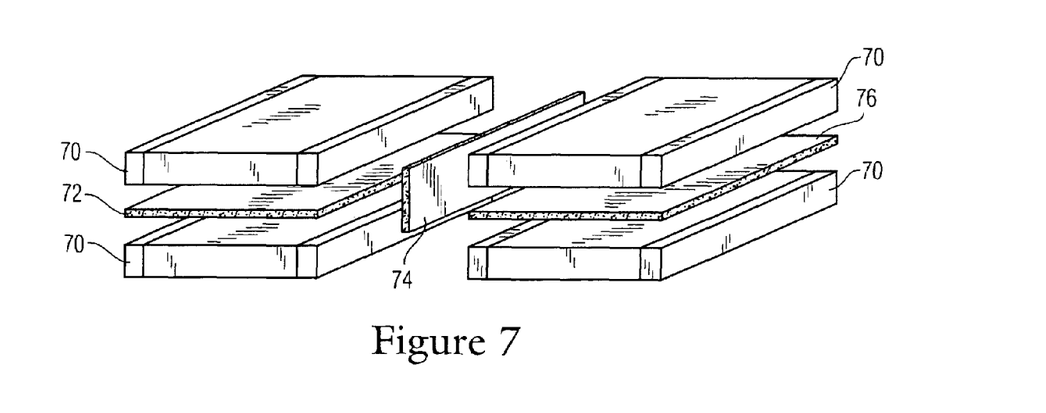
FIG. 7 is a perspective view of an array or bank of connected capacitors including additional connective, conductive, or insulating layers.

Another aspect of the present invention pertains to the grouping or connecting of more than one capacitor 50 of the present invention. As seen in FIGS. 5-7, the capacitors 50 can be stacked or connected both vertically and horizontally. For illustrative purposes, FIGS. 5-7 show the capacitors 50 of the present invention in the flatpack embodiment as they help illustrate the ability to stack and combine the capacitors 50. The capacitors 50 may be connected to one another using various techniques including bonding, soldering, or other mechanical and chemical methodologies including the use of special inks and epoxy. Further, additional terminals could be utilized to connect 2 or more capacitors 50.

As seen in FIG. 7, the capacitors 70 may be combined or connected utilizing various connecting or insulating layers 72, 74, 76 inserted between the capacitors 70. The layers 72, 74, 76 could be used to adhere the capacitors together and to provide an electrical connection or an isolation barrier. The layers 72, 74, 76 need not encompass the entire shape of the capacitors 70 and might only adhere or isolate on terminal or side of a capacitor 70. Through proper placement of the capacitors 70, the use of various mechanical and chemical connection methods and the use of connective or isolating layers 72, 74, 76 the capacitors can stacked or joined in series or parallel.

Figure 8:
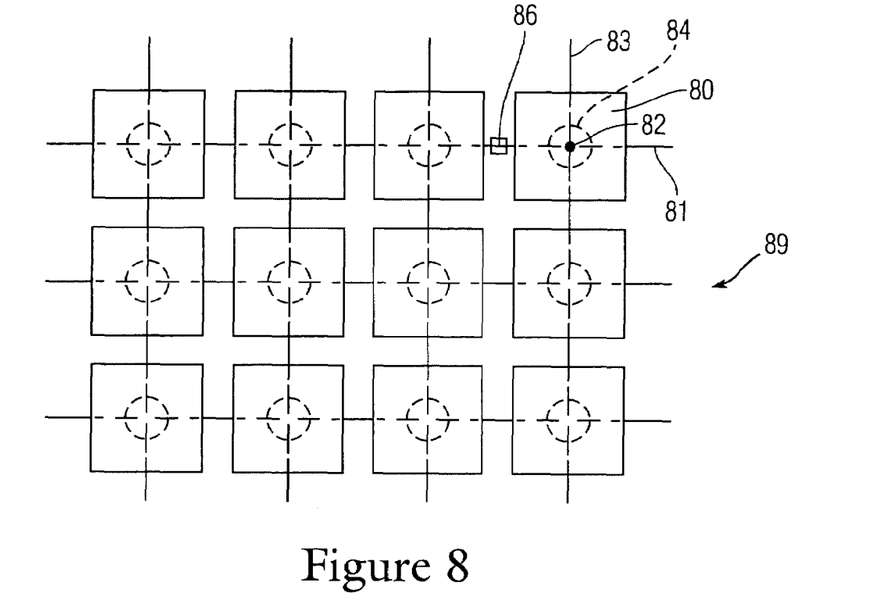
FIG. 8 is a schematic plan view of an array or grid of connected capacitors of the present invention.
Figure 9:
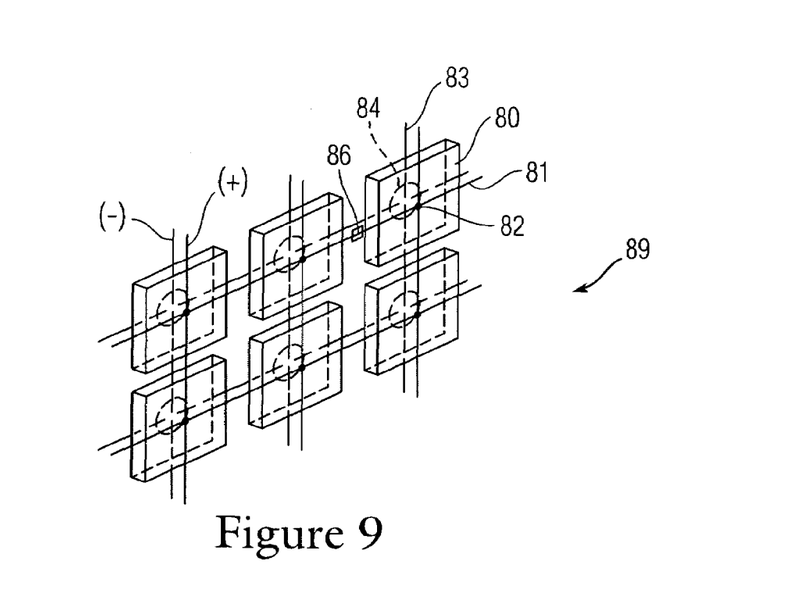
FIG. 9 is a perspective view of an array or grid of connected capacitors of the present invention.

As seen in FIGS. 8-9, the capacitors 80 can also be combined or connected into a matrix or grid 89. The grid 89 can be fabricated using a conductive mesh like structure 81, 83 fabricated from wire-mesh, wire bonding, or using a sputtered/deposited technique. The wire mesh 81, 83 could be applied to opposite sides of the capacitors 80 and could provide the positive 81 and negative 83 connections to a voltage source. The capacitors 80 would be attached to the mesh structure 81, 83 at respective nodes 82, 84 to form the grid 89. The nodes 82, 84 would provide the connection to the appropriate terminal of each capacitor 80 while isolating the opposite capacitor terminal. The embodiment depicted in FIGS. 8-9 shows the capacitors 80 of the present invention connected in parallel to increase the total energy storage capability of the linked components or grid 89.

In addition, fuses 86 may be placed at any location in between the capacitor 80 connection points or nodes 82, 84 within the grid 89. The fuses 86 may be thin traces that form small fuses or other known fuses based on the physical size determined by the application and electrical current requirements. Application of the fuses using a sputtered or deposition technique would include using a non-conductive medium to suspend or hold the capacitor devices in place when the fuses are applied or connected. The properties of the conductor used for the fusing process might also determine the conductor's diameter based on resistance and current carrying capability. The grid 89 design with integrated fuses 86 enables a local failure of one or more individual nanocapacitor cells 80 to be isolated, as the fuse 86 to the particular failed component or capacitor 80 will cause an open circuit for that device but not the entire grid 89. This "graceful failure" increases the safety of the device upon impact when used as a multi-purpose structural component. The grid configuration also allows flexibility between devices such that a curved surface can be produced that can be form fitted to the required application.

The capacitors can also be combined with additional capacitors by using additional conductive plates added to the external capacitor sides. These additional conductive plates enhance the electrical current carrying capability of the device as well as provide a way to connect multiple capacitors. The conductive plates can be added through soldering techniques or ink/epoxy bonding applications as previously discussed.

Figure 10:
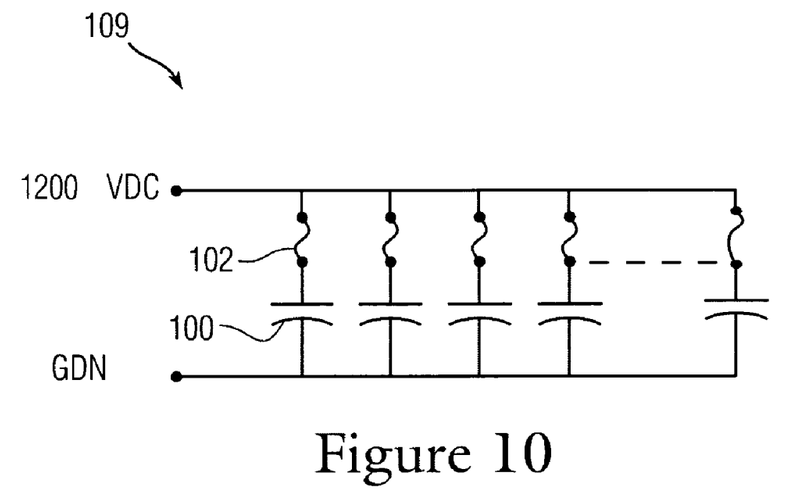
FIG. 10 is a schematic diagram of the capacitors of the present invention connected in a parallel configuration.
Figure 11:
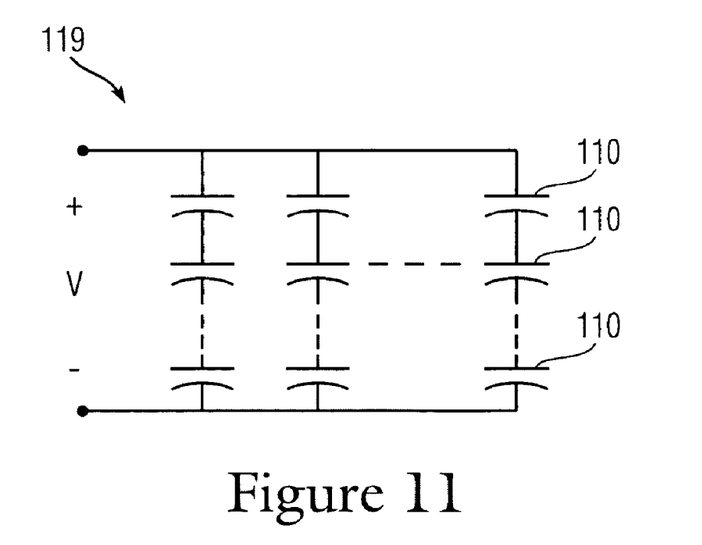
FIG. 11 is a schematic diagram of the capacitors of the present invention connected in a parallel and series configuration.

FIGS. 10 and 11 provide schematic diagrams of the capacitors connected as a grid or array. Specifically, FIG. 10 provides a schematic diagram of an array or grid 109 of numerous capacitors 100 of the present invention connected in parallel. The grid 109 could include corresponding fuses 102 with each capacitor 100. FIG. 11 provides a schematic of a grid 119 of capacitors 110 where the capacitors are connected in both a series and parallel configuration. Although fuses are not depicted in FIG. 11, they could be employed.

The present invention provides is a multi-layered nanocapacitor formed by at least two electrode plates and one or more dielectric layers placed between the conducting electrodes or plates. The electrodes or the dielectric layers may consist of a single thin layer, or several layers of the same material, built up to form the appropriate thickness as required to best suit the application. The nanocapacitor may consist of layers ranging from nanometers thick, to several microns.

The terminals or electrode material may consist of any conductor-metal, metal oxide, alloy, or ceramic, suitable for electrical conductive purposes including, but not limited to, Ag, Cu, Pt, Pd, Ni, Au, La, and Al. The conductor material is chosen based on its interaction with the dielectric material utilized in the nanocapacitor device. The conductor and dielectric material are chosen based upon the desired power characteristics and the properties of the dielectric-conductor interface layer such that this interface layer provides optimal adhesion and thermal matching characteristics, minimal electromechanical reaction and diffusion, and an increase in the local interfacial work function wherein charge injection is limited to provide for increased breakdown voltage.

One important aspect of the present invention is the dielectric materials utilized for the nanocapacitor. The present invention is ideally suited for dielectric materials which provide and exhibit a high permittivity and dielectric constant (K) ranging from 1000 to 1,000,000 depending on the formulation. Dielectric materials with a high permittivity and dielectric constant (K) that are ideally suited for the nanocapacitor of the present inventions include the perovskite-oxides with the $ABO_3$ structure. Table 1 provides a list of several perovskite, and non-perovskite, materials that are ideally suited for the permittivity specifications for the nanocapacitor implementation of the present invention. Table 1 provides exemplary dielectric materials and does not list all of the possible materials nor limit the applicable dielectric materials which can be utilized within the present invention.

TABLE 1

| Material | Dielectric Constant (K) |
|---|---|
| $BaSrTiO_3$ (BST) | 800-1,000 |
| $Pb(Mg,Nb)O_3$ (PMN) | 3,000 |
| LiSiNiO (LSNO) | 12,000 |
| $PbFeNO_3$ (PFN) | 9,000-40,000 |
| $BaTiO_3$ (BTO) | 2,000-300,000 |
| $CaCu_3Ti_4O_{12}$ (CCTO) | 700-1,000,000 |

The variation or ranges in dielectric constant values for an individual material is determined by the processing and optimization of certain electrical features, depending on the application, and temperatures. An example of processing effects on the dielectric value is that of the sintering environment. A reducing atmosphere verse an oxidizing atmosphere will produce different dielectric constant values with varying loss tangents.

In addition, more than one dielectric may also be used so as to improve the overall electrical characteristics such as breakdown voltage and resistivity of the dielectric region. The Logarithmic Mixing rule allows for more than one dielectric to be combined or layered with another in which case the overall permittivity may be reduced, but with the enhancement of the combined electrical properties. The Logarithmic Mixing Rule is $$\ln K \log = V_L \ln K_L + V_S \ln K_S$$

where K log is the effective combined K, $V_L$ if the relative percent volume of total mix constituent L, $V_S$ is the relative percent of total mix of constituent S, $K_L$ is the dielectric value of constituent L, and $K_S$ is the dielectric value of constituent S.

In addition to mixing and layering different dielectric materials, the dielectric-conductor or dielectric-electrode interface may consist of additional materials to enhance the performance of the nanocapacitor. As an example, more than one type of conductor or ceramic may be used in the nanocapacitor. A practical use of more than one type of conductor or materials would be to use a different type of conductor as an intermediate bonding layer between the dielectric material and the outer electrode plates.

The result of the capacitor of the present invention is a device which consists of one or more high dielectric constant materials with a dielectric constant (K) value ranging from 1000 to over 1 million providing a breakdown voltage (Vbr) ranging from 0.1 to over 11 MV/cm, both as intrinsic and extrinsic values for a range of high dielectric materials including, but not limited to, perovskite related oxides. The results of utilizing high dielectric materials and an interleaved construction as described herein, allow for the nanocapacitor device to demonstrate very high specific power and very high specific energies, rivaling or exceeding ultracapacitors, batteries, and fuel cells, with the potential to exceed the energy output of gasoline in the internal combustion engine (ICE).

Although the capacitor of the present invention is ideally suited for fabrication at the nanometer layer for optimizing specific energies it is not restricted to nanometer layers. The electrodes or conductive material and dielectric material may be applied by, but is not limited to, several methodologies including physical vapor, chemical vapor, chemical solution, pulsed electron beam, and pulsed laser deposition, magnetron sputtering, diode sputtering, as well as screen printing, thermal spray, spin coating, and other appropriate film techniques. Through the various techniques the numerous alternating layers of the capacitor of the present invention are formed. The capacitor may have a limited number or layers or thousands of layers.

In addition, the nanocapacitor of the present invention may consist of multi-layered materials that have or provide significant mechanical strength and robustness enabling the capacitor to be utilized as a structural component in addition to a power supply. Building up a structure of thin, nearly void free layers, increases the overall net mechanical strength of a system or device which incorporates the nanocapacitors.

Screen-printing

A preferred method for producing the nanocapacitor of the present invention utilizes a screen-printing technique that is both inexpensive and environmentally friendly. Screen-printing is also well suited for larger large surface areas enabling the nanocapacitor to be fabricated at a size well beyond that of typical surface mount capacitor components.

The fabrication process for a nanocapacitor of the present invention employing screen-printing will now be described. First, a substrate with optimal characteristics for thermal and adhesion qualities to match the selected conductor and dielectric material is chosen as a base-plate to commence the layering process. Several substrate materials can be used including, but are not limited to: $BaTiO_3$, MgO, $Al_2O_3$, La-based, Ti-based, Si-based, Ba, Mg, Al, NaCl and other appropriate based materials. In a minimal or simplified configuration, a conductor material is printed on the substrate and then oven fired. When required or desirable, an interface layer of a mix if conductor material and dielectric material is applied and then the device is over fired. Next, a dielectric layer is printed onto the device followed by oven sintering. Another interface layer is applied and then oven fired. The device than has another conductor layer added and the device is oven fired, thus achieving one full capacitive layer. The printing and layering process is continued until all layers are obtained based on the desired performance of the device. The typical screen mesh for screen-printing ranges from 200-500 units to allow for consistent, uniform, thin layers.

An example of a capacitor of the present invention with a perovskite based dielectric material fabricated utilizing screen-printing is herein described. First, a $BaTiO_3$ substrate is coated with silver (Ag) ink using a wire mesh screen and an appropriate mask to form an anode conductor, approximately 5-10 microns thick. The Ag ink is heated to 850 degrees Celsius to remove the organic binder. A prepared paste of formulation $PbFeNO_3$ is applied and then the device is fired with a ramping profile to 930° C. in air. A belt furnace consisting of five heated zones, each 18" in length, are set to 650° C., 775° C., 930° C., 930° C., and 930° C. The final three stages allow a 10-11 minute peak temperature hold time. The entire dielectric layer firing takes 30 minutes. Another silver (Ag) ink layer is applied to the device form a cathode conductor and the device is heated again. An additional dielectric layer is applied and fired as previously described. The process of alternating conductors and dielectrics continues until the desired number of layers for a required application has been reached. A hot isostatic pressing (HIP) procedure is employed as a final stage to remove voids, thus increasing the breakdown voltage and improving the overall dielectric constant. An encapsulating glaze can be added to coat the device when porous dielectrics are used, acting as a moisture barrier between the electrodes and the dielectric. The glaze has shown to provide a marked improvement in performance by increasing the breakdown voltage and insulating resistance.

Pulsed Laser Deposition

Another fabrication technique which can be employed for the capacitor of the present invention is the use of pulsed laser deposition (PLD). By way of example, PLD will be described in conjunction with the fabrication of a capacitor utilizing copper (Cu) as the conductive material and CCTO ($CaCu_3Ti_4O_{12}$) as the dielectric material.

First, a 1.5 micron layer of Cu is deposited on an MgO substrate using a Cu target, in an oxygen environment at 200 mTorr and 700° C. In step 2, a 50 nm buffer or interface layer of $LaNiO_3$ (LNO) is deposited on the Cu layer using a solid target consisting of $LaNiO_3$ and an appropriate mask.

The chosen material for the bottom electrode of the capacitor has been shown to greatly enhance the overall performance of the device. Ideal properties of the negative or bottom electrode are sufficient resistance against oxidation, good adhesion to mating films, and high metallic conductivity. LNO is an ideal candidate in that it fulfills the above criteria and is a much lower cost material than Pt, Pd, and Au. In addition, LNO is a pseudocubic perovskite structure that is well matched to CCTO and exhibits a resistivity lower than 10E−3 Ohm-cm. The LNO layer can further increase the dielectric constant by promoting a homogenous grain distribution of CCTO.

In step 3, a 500 nm layer of CCTO is deposited using a prepared target and mask. In this example, only the negative electrode or bottom Cu layer (see Step 1) has an interface layer applied so improve electrode performance but additional interface layers could be applied between the dielectric layers and conductor layers. Step 4 provides that a 1.5 micron layer of Cu is then applied using a prepared target and mask. The process of adding conductor, interface, and dielectric layers is continued until the desired number of layers has been deposited to achieve the required energy output for a particular application.

Further, the capacitors could be fabricated with an overglaze that will encase the capacitor device so as to reduce oxidation and moisture effects at the electrode/dielectric interface, thus improving both the breakdown voltage and insulating resistance. In addition, conformal coating could be applied to a three-dimensional object using thermal spray or deposition techniques (PLD, PEB, CVD, sputter, etc.) in multiple layers so as to produce a nanocapacitor on an object.

The area or size of the capacitor must also be considered when fabricating the devices. As the area of a capacitor is increased, the likelihood of device failure increases due to an increase in irregularities in the layered surfaces. Inconsistent films can lead to stressed regions that contribute to the breakdown and electrical shorting of a device. Larger capacitors or fabricated areas require higher tolerance fabrication equipment that can ensure a consistent film thickness across the full surface area. To reduce the above problems when employing screen printing techniques, the use of calendered (flattened) meshes improved the overall flow of a paste, thus resulting in consistent film layers. In addition, optimal conductor materials are chosen to reduce the diffusion of conductors into the dielectric regions or layers. An example is the chemical matching of silver-based electrodes with the PFN dielectric material. When platinum electrodes are used instead of silver, the capacitance of a device is reduced eight fold due to variations in the preferred pure dielectric region being filled by diffused conductor material.

The use of pulsed laser deposition on substrates measuring 5" in diameter are commonly produced with minimal defects. The choice of a suitable substrate material and intermediate adhesion and interface layers are an important aspect to allowing epitaxial verse poly-crystalline films to be grown. The substrate atomic orientation can also be an important factor in developing void-free layers on larger surface areas since the atomic stacking is determined at the surface interface of the substrate and the initial conductor layer. For the material CCTO, substrates such as silicon, alumina, and magnesium with an orientation <100> are used to ensure proper layer construction.

Utilizing a PLD technique similar to that described above to fabricate a flatpack capacitor with a reported dielectric constant value (K) for CCTO of 300,000 and plates of thick copper (Cu) would result in a nanocapacitor with the following power and energy characteristics:

Dielectric constant of CCTO: 300,000
Nanocapacitor dimensions: 20 cm, 30 cm, 0.1 cm
Number of capacitor layers: 275
Dielectric thickness: 2.14 microns (utilizing PLD~4 individual layers)
Thickness of copper plate: 1.5 microns ---------------
Breakdown field: 2.8 MV/cm
Nanocapacitor voltage: 600 Volts
Total capacitance: 20.4 Farads
Energy: 1020 Whr
Specific energy: 2570 Whr/kg
Energy density: 17,000 Whr/l
Equivalent Series Resistance: 0.2 milliohms The nanocapacitor of the present invention employing the structure, materials, and fabrication techniques as herein described provides significant power characteristics meeting or exceeding those of batteries and fuel cells. The Cu and CCTO capacitor example given above provides a large nanocapacitor with enough power, 600 Volts and 1,020 Whr modules, to power an electric vehicle at a typical overall efficiency of 60%. This meets or exceeds the ranges and efficiency of gasoline powered internal combustion engines with a typical efficiency of 15%. At a dielectric constant value (K) of 300,000 the specific energy would be equivalent.

To illustrate the capabilities of the capacitor of the present invention we will elaborate on its use for hybrid or electric vehicles. The range requirements in electric vehicles require very high energy to replace gasoline. The acceleration and regenerative breaking systems in electric and hybrid vehicles require high power devices to complement their energy sources. The high power nanocapacitors of the present invention can meet these requirements. The trade off between power (large number of thin plates) and energy (thick plates) required in batteries to meet electric vehicle duty cycles is overcome by the nanocapacitors of this invention due to the inherently high dielectric constant, low impedance of the thin plates, and the thin dielectric design.

For comparison, gasoline in conventional internal combustion vehicles has a specific energy of about 10,000 Whr/kg, at 15% efficiency, which produces about 1500 Whr/kg at the road. A utility charged electric vehicle powered by the exemplary Cu and CCTO nanocapacitor described above would be capable of a specific energy of 2570 Whr/kg, with a 60% efficiency to produce approximately the same 1500 Whr/kg at the road with no localized pollution.

Further, the cycle life of the capacitor of the present invention would be above hundreds of thousands of cycles since recharge does not depend on chemical reactions as with batteries and, therefore, has no reversal losses per cycle. Pure electric vehicles currently do not have adequate range when powered by batteries alone, and since recharging requires several hours, the vehicles are viewed as impractical for driving extended distances. The capacitors of the present invention overcome these limitations due to their high specific energies and the fast recharge capability inherent in high power capacitors. Nanocapacitors have high charge-discharge efficiencies based on the extremely low equivalent series resistance (ESR) inherent in the device due to the multi-layering of conductive layers in parallel, reducing the overall device resistance, and allowing for maximum efficiency when extracting energy from the nanocapacitor. Since the full system voltage (i.e. 1200 VDC) is that of a single device, the layering process removes the multitude of series internal resistances that are additive in typical 2 Volt battery systems made of many cells connected in series (600 required to obtain 1200 VDC system).

In addition, the device exhibits a low leakage resistance that allows for extended use beyond that of many current batteries, such as nickel metal hydride (NMH). High self-discharge rates of up to 10% per day render typical NMH battery useless after a few weeks.

Each application will have its own size, weight, and power requirements. For certain applications, very high power density figures are desirable and can be provided by embodiments of the present invention through the use of relatively large parallel-plate conductors for low resistance combined with metal-oxide dielectric materials to provide for low loss. High energy densities are obtained by increasing either the dielectric constant (K) or the breakdown voltage (Vbr), or both. Increasing the breakdown voltage is especially fruitful, because the energy density (E) increases proportional to the square of the breakdown voltage. The capacitor energy storage equation is defined by a capacitance (C) and a working voltage (V) as:

$$E=(\tfrac{1}{2})CV^2$$

It has been demonstrated that large-area pinhole-free films can be fabricated using pulsed laser deposition (PLD) as one means of implementing the present invention. PLD and other appropriate methodologies can be used to deposit the dielectric materials in layers to form a nano-laminate or thicker laminate as appropriate. Increasing the number of layers significantly decreases the possibility of voltage breakdown.

In summary, the present invention provides a capacitor with significant power and energy characteristics. The capacitor is capable of producing: (1) specific energies ranging from 5 to 10,000 Whr/kg; (2) energy densities ranging from 20 to 76,000 Whr/l; (3) charge-discharge cycle life ranging from 100,000 to above 1 million cycles before reaching 20 percent permanent loss of original capacity depending on temperature; and (4) a capacitor capable of handing a discreet nominal voltage that could range from 50 to 5,000 volts or more, depending on the application. Further, the capacitor of the present invention could be produced with the resistivity of the dielectric layer ranging from $1\times10^{+6}$ to $1\times10^{+15}$ Ohm-cm.

An additional advantage of the present invention is that an extremely high energy density source is provided which can be fabricated for space constrained and weight constrained applications. In addition to the electrical advantages of the nanocapacitor, the multilayered materials have significant mechanical strength and robustness that can be utilized for structural components. A significant reduction in weight and volume for both electrical and hybrid vehicles could be realized by replacing all or part of the original structure of the vehicle with a multi-purpose material. Use of the present invention in this manner could serve both energy and a mechanical function (body, floor, bumpers, frame, haul, wing, fuselage, etc.) for the vehicle, craft, or other powered device.

Further, the nanocapacitor design of the present invention is suitable for use as a load leveling capacitor in electric and hybrid vehicles. Such structures are also useful as snubber capacitors for motor drives, energy discharge capacitors for lasers, and other industrial and military applications such as active armor, rail guns, combat hybrid power systems, all electric warships, decentralized energy storage, etc. In short, nanocapacitors of the present invention have the characteristic and ability to replace common batteries with the many advantages of a solid state device which include extremely long life with no reverse cycling losses produced by the chemical reactions of current cells.

Another significant advantage of the nanocapacitor of the present invention is that it can be designed to operate at high voltages, usually at the actual required system voltage, because they are not limited to nominal battery cell voltages (typically 2 volts). The same limitation applies to ultracapacitors, which are double-layer devices with cells limited by the electrolyte charge breakdown voltage of 2 to 3 volts, depending on whether the electrolyte is sulfuric acid or an organic electrolyte. The nominal voltage limitation of known battery and ultracapacitors requires a large numbers of cells connected in series, typically 150 cells, to obtain a 300-volt system. Further, the tight balancing of cells with multiple high current connections is required for these systems raises cost, maintenance, and safety issues. The capacitor of the present invention is capable of operating at high voltages limiting the number of complicated and expensive connections prevalent in systems with a large number of devices.

Although particular embodiments of the present invention have been described, such is not intended to limit the invention. Modifications and changes will no doubt become apparent to those skilled in the art, and it is intended that the invention only be limited by the scope of the appended claims.

I claim:

1. A capacitor, comprising:
   a top conductor layer of a conductive material;
   a bottom conductor layer of said conductive material; and
   at least one intermediate dielectric layer of a dielectric material disposed between said top layer and said bottom layer; wherein said at least one intermediate dielectric layer is comprised of a dielectric material with a dielectric constant in the range 800 to 1,000,000; and
   at least one interface layer comprised of a mix of said conductive material and said dielectric material disposed between said at least one intermediate dielectric layer and said top conductor layer or said bottom conductor layer.

2. The capacitor of claim 1, wherein said capacitor produces specific energies in the range of 5-10,000 Whr/kg.

3. The capacitor of claim 1, wherein said capacitor produces energy densities in the range of 20-76,000 Whr/l.

4. The capacitor of claim 1, wherein said at least one of said top conductor layer or said bottom conductor layer is a multilayer conductor layer.

5. The capacitor of claim 1, wherein said at least one intermediate dielectric layer is a multilayer dielectric layer.

6. The capacitor of claim 1, wherein said top conductor layer and said bottom conductor layer function as electrodes.

7. The capacitor of claim 1, wherein said conductive material is selected from the group consisting of Ag, Cu, Pt, Pd, Ni, Au, La, and Al.

8. The capacitor of claim 1, wherein said dielectric material is selected from the group consisting of BST, PMN, LSNO, PFN, BTO, CCTO.

9. A capacitor, compromising:
   a top conductor layer of a conductive material;
   a bottom conductor layer of said conductive material; and
   at least one intermediate dielectric layer of a dielectric material disposed between said top layer and said bottom layer; wherein said at least one intermediate dielectric layer is comprised of a dielectric material with a dielectric constant in the range of 800 to 1,000,000; and
   at least one intermediate conductor layer comprised of said conductive material disposed between a first intermediate dielectric layer and a second intermediate dielectric layer.

10. The capacitor of claim 9, wherein said top conductor layer is connected to a first terminal, said bottom conductor layer is connected to a second terminal and said at least one intermediate conductor layer is connected to said first terminal or said second terminal.

11. The capacitor of claim 9, wherein said first intermediate dielectric layer and said second intermediate dielectric layer are connected.

12. The capacitor of claim 9, wherein a first intermediate conductor layer and a second intermediate conductor layer of said at least one intermediate conductor layers are interleaved.

13. A capacitor, comprising:
   a top conductor layer of a conductive material;
   a bottom conductor layer of said conductive material;
   at least one intermediate dielectric layer of a dielectric material disposed between said top layer and said bottom layer; wherein said at least one intermediate dielectric layer is comprised of a dielectric material with a dielectric constant in the range 800 to 1,000,000;
   at least one interface layer comprised of a mix of said conductive material and said dielectric material disposed between said at least one intermediate dielectric layer and said top conductor layer or said bottom conductor layer;
   at least one intermediate conductor layer comprised of said conductive material disposed between a first intermediate dielectric layer and a second intermediate dielectric layer of said at least one intermediate dielectric layer; and wherein said capacitor produces specific energies in the range of 5-10,000 Whr/kg and said capacitor produces energy densities in the range of 20-76,000 Whr/l.

14. A grid of capacitors interconnected, wherein each of said capacitors comprises:
- a top conductor layer of a conductive material;
- a bottom conductor layer of said conductive material; and
- at least one intermediate dielectric layer of a dielectric material disposed between said top layer and said bottom layer; wherein said at least one intermediate dielectric layer is comprised of a dielectric material with a dielectric constant in the range 800 to 1,000,000; and
- at least one interface layer comprised of a mix of said conductive material and said dielectric material disposed between said at least one intermediate dielectric layer and said top conductor layer or said bottom conductor layer.

15. A method of fabricating a multilayer capacitor, comprising the steps of:
- depositing a bottom conductor layer of a conductive material onto a substrate to form a capacitor device;
- heating the device;
- masking selected areas of the device;
- depositing an interface layer of an interface material mixture the device removing the maskant;
- heating the device;
- masking selected areas of the device;
- depositing a dielectric layer of a dielectric material on the device;
- removing the maskant;
- heating the device;
- depositing a top conductor layer of said conductive material on the device; and
- heating the device.

16. The method of claim 15, wherein at least one of said bottom conductor layer, said top conductor layer, said interface layer, or said dielectric layer is deposited by print screening.

17. The method of claim 15, wherein at least one of said bottom conductor layer, said top conductor layer, said interface layer, or said dielectric layer is deposited by pulse laser deposition.

18. The method of claim 15, wherein the conductive material is selected from the group consisting of Ag, Cu, Pt, Pd, Ni, Au, La, and Al.

19. The method of claim 15, wherein the dielectric material is selected from the group consisting of BST, PMN, LSNO, PFN, BTO, CCTO.

20. The method of claim 15, further compromising the step of repeating the pattern of depositing a conductor layer, and interface layer, a dielectric layer, a second interface layer and another said conductor layer until the desired number of layers is obtained.

21. The method of claim 20, wherein said conductor layers are formed to be connected to a conductive terminal.

22. The method of claim 20, wherein said conductor layers are formed in an interleaved formation.

23. The method of claim 20, wherein said dielectric layers are formed to be interconnected.

24. The method of claim 15, further comprising the steps positioning the fabricated capacitors adjacent to one another and interconnecting said capacitors to form an array, bank, or grid of capacitors.

25. The method of claim 24, further compromising the step of positioning and connecting fuses in between the capacitors.

* * * * *